United States Patent [19]

Söchting

[11] Patent Number: 4,466,556
[45] Date of Patent: Aug. 21, 1984

[54] DISPENSING METHOD AND APPARATUS FOR CONTROLLABLE DISPENSING OF OXYGEN AND LIQUIDS IN BIOLOGICAL SYSTEMS

[76] Inventor: Klaus Söchting, Keltenstrasse 33, 8029 Sauerlach, Fed. Rep. of Germany

[21] Appl. No.: 355,910

[22] Filed: Mar. 8, 1982

[30] Foreign Application Priority Data

Mar. 10, 1981 [DE] Fed. Rep. of Germany ....... 3109064

[51] Int. Cl.³ .............................................. B67B 7/00
[52] U.S. Cl. ..................................... 222/1; 422/122; 222/129; 222/394
[58] Field of Search ................. 222/1, 3, 61, 129, 135, 222/136, 130, 394, 399; 141/1, 4, 5; 423/579; 422/190, 193, 120, 122

[56] References Cited

U.S. PATENT DOCUMENTS

Re. 26,529  3/1969  Lichtenberger et al. ............... 222/1
2,721,788  10/1955  Schad ................................... 422/190
3,482,736  12/1968  Green ................................... 222/136
3,492,093   1/1970  Start et al. ............................ 423/579
3,831,811   8/1974  Becker .................................. 222/1

Primary Examiner—Joseph J. Rolla
Assistant Examiner—Kenneth Noland
Attorney, Agent, or Firm—Curtis, Morris & Safford

[57] ABSTRACT

The invention concerns a method and apparatus for dispensing of oxygen and liquids in biological systems, wherein the dispensing is powered by a drive gas formed by the continuous catalytic decomposition of hydrogen peroxide to form water and oxygen. The decomposition of hydrogen peroxide takes place in stages, wherein in a first step only a first amount of gas is liberated in a first container and a further decomposition of hydrogen peroxide takes place in one or more further containers. This method and apparatus are particularly suitable for the continuous production of oxygen, decontamination and disinfection in aquaria and free standing water as well as for the watering of plants and the supply of drinks for animals, where suitable active ingredients can be added to the water.

17 Claims, 5 Drawing Figures

DISPENSING METHOD AND APPARATUS FOR CONTROLLABLE DISPENSING OF OXYGEN AND LIQUIDS IN BIOLOGICAL SYSTEMS

The invention relates to a dispensing method and apparatus for controllable dispensing of oxygen and liquids in biological systems.

In various areas, in the maintenance of biological systems there exists a requirement for an equal measured and desired delivery of active ingredients over a long period of time. This is for example the case in the keeping of animals and plants in closed rooms and outdoors, in and out of water, wherein oxygen, water, fertilizers, decontamination agents, pesticides, and disinfectants should be introduced.

Areas in which the method according to the invention brings essential simplifications in the maintenance and technical expenditure and/or satisfactorily solves problems, are in general:

1. supply of oxygen, decontamination and disinfection in aquarias and open areas of water; and
2. watering of plants and supplying of drinking water animals, wherein suitable active ingredients can be added to the water.

German patent application No. M 16325 IX/42e describes a device for dosing a fluid additive, which is added to a flowing liquid, in which via a dosing throttle the pressure head in the supply of the additive is regulated by a pressure regulator acted upon by the pressure head in the fluid conduit. German Auslegeschrift No. 26 27 343 discloses a dosing device in the form of an aerosol package wherein as drive gas liquid gases are used. German Auslegeschrift No. 25 36 702 describes likewise a method in which for generation of pressure in a drive gas container microorganisms are used which cause a carbon dioxide liberating fermentation.

Methods are also known from German Auslegeschrift No. 20 54 123 and No. 25 34 892 which describe the addition of hydrogen peroxide to effluent for the decontamination of nitriles, sulfides, sulfites and thiosulfates contained therein.

Dosing devices which have inter alia a container provided with a feed pipe, are known from German Auslegeschrift No. 16 67 055 and German Patent No. 12 51 278. Thus, Auslegeschrift No. 16 67 055 describes a dosing apparatus for pressurized or unpressurized ducting systems which attempts to regulate the liquid inflow of the solution of a solid or liquid chemical held in the container by means of a multichanneled tap. This liquid regulation does not, however, take place automatically and also does not provide for the use of a catalytically decomposing chemical with the production of a drive gas. German Patent No. 12 51 278 describes a device for introducing a solution of a solid substance into a liquid stream by means of a throttle device, wherein the throttle device consists of porous material. Also this device discloses no automatic dosing as a consequence of continuous catalytic decomposition with the formation of drive gas.

One object of the present invention is to make available a dispensing method and apparatus with which oxygen and liquids can be added to a biological system.

A further object of the invention is to provide a controllable dispensing method and apparatus. A further object of the invention is to provide a dispensing method and apparatus with which dispensing can take place over a long period of time without manual intervention. A further object is to dispense evenly as a function of time.

A yet further object is to dispense without production of harmful by-products.

According to one aspect of the invention, there is provided a method for dispensing oxygen or liquid in which method:

(a) in a first container continuous catalytic decomposition of hydrogen peroxide solution produces water and oxygen;
(b) the oxygen is used as a drive gas to force hydrogen peroxide from the first container into at least one further container containing a catalyst;
(c) further continuous catalytic decomposition of hydrogen peroxide solution takes place in said at least one further container; and
(d) oxygen from the final container is either utilized as a drive gas for dispensing liquid or is itself dispensed.

According to a further aspect of the invention, there is provided a method for the controllable dispensing of oxygen and liquids in biological systems, in which method dispensing takes place by means of a drive gas formed by the continuous catalytic decomposition of hydrogen peroxide into water and oxygen, said decomposition of the hydrogen peroxide taking place in stages, wherein in a first stage a first portion of the gas is liberated, decomposition of further hydrogen peroxide taking place in one or more further containers in communication with the first.

According to a further aspect of the invention, there is provided a dispensing apparatus for dispensing oxygen or liquids comprising: a first container for containing hydrogen peroxide solution and a catalyst for catalysing its decomposition; a further container for containing said catalyst; and feed means connecting said first container with said further container whereby oxygen produced by catalytic decomposition in said first container can drive hydrogen peroxide solution to said further container.

The method according to the invention as well as the device for carrying out the same is distinguished particularly in that hydrogen peroxide is decomposed in aqueous solution by means of stable catalysts stage by stage to form oxygen and pure water. The oxygen metastably stored abundantly in hydrogen peroxide is thereby obtained and completely used over a long time period uniformly—that is to say without noticeable trend—for the expulsion of liquids and for the supply of oxygen.

The dosing, that is to say the liberated amount of oxygen per unit time, to which also the delivered liquid quantity corresponds, is proportional to the active upper surface of a solid catalyst. Through choice of the size of the upper surface the dosing at a determined temperature and concentration of hydrogen peroxide solution is determined. The operational time and/or the waiting interval results then from the size of the reserve in the dosing container. In a liter of the usual 3 and/or 30% aqueous hydrogen peroxide solution are stored in a metastable condition 10 to 100 liter of oxygen under standard conditions, which solution can be utilized for the expulsion of a corresponding amount of a liquid.

From numerous relevant and examined catalysts has been established particularly a special form of activated charcoal and manganese dioxide bound to a suitable carrier as adequately active, enduring and dimensionally stable; in particular manganese dioxide displays a high moistening power which leads at decomposition to small bubbles so that with this catalyst a dosing of fractions of ml/day can be achieved. With both catalysts was shown a clearly negligibly proportional dependency upon the concentration of aqueous hydrogen peroxide solution, which can be explained through a type of saturation effect. Both catalysts showed a doubling of activity at a temperature level of in each case 80° C., which corresponds to a wide region of intense activity in biological systems.

According to a particular embodiment of the invention standardized catalyst portions should be introduced into the hydrogen peroxide solution. In addition, it is possible on the floor and/or the walls of the container, to spread over or to provide on the inner sides of the feed pipe or a part thereof a solid catalyst.

For a better understanding of the invention and to show how the same may be carried into effect, reference will now be made, by way of example, to the accompanying drawings, in which.

Figure 1:
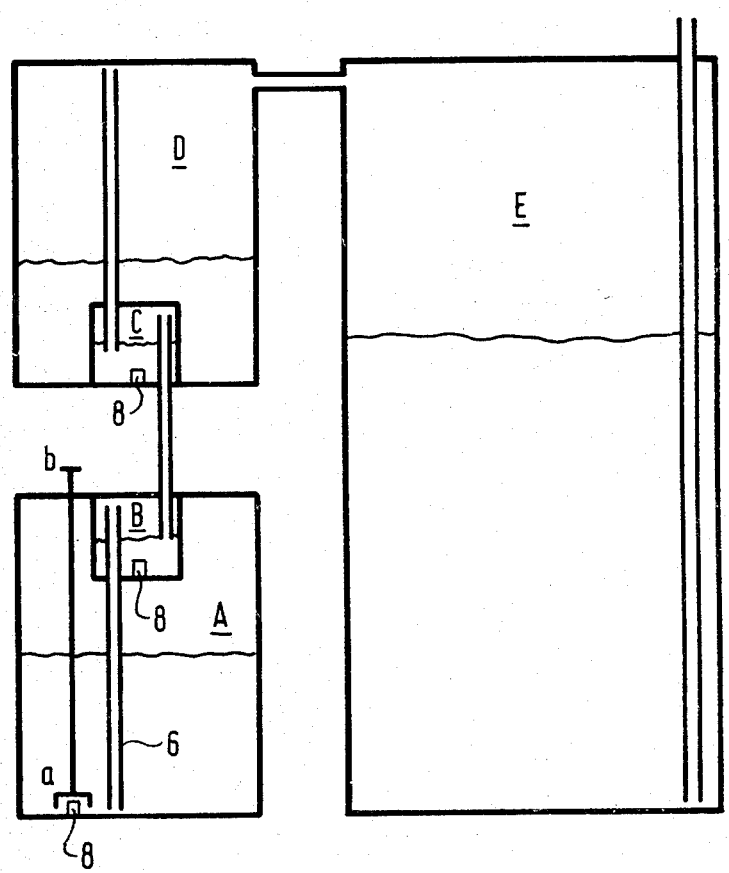
FIG. 1 shows schematically an embodiment of dispensing apparatus according to the invention.

The dosing apparatus according to the invention consists of a plurality of robust containers connected together by feed pipes. In FIG. 1 is schematically reproduced a general schematic illustration of apparatus according to the invention, which can be simplified by reducing it appropriately for special areas of use.

FIG. 1 shows a cascade arrangement having containers A to E.

Container A contains hydrogen peroxide solution and a catalyst 8 whose active area in contact with the solution may be adjusted by movement of a controllable "hat" a e.g. by a handle b. A feed tube 6 extends from the solution in container A into further container B which forms a second stage and which in this embodiment is positioned within container A. Container B contains also catalyst 8 and hydrogen peroxide solution. From container B a further feed tube extends to the third stage container C also containing catalyst 8 and hydrogen peroxide solution. Container C is in this embodiment contained within further container D and is in communication therewith via a further feed tube. Container D acts as a trap and is in communication with the container E containing liquid to be dispensed.

The hydrogen peroxide solution in containers A, B and C catalytically decomposes to form water and oxygen. Oxygen produced in container A outside the feed tube 6 pressurises container A and forces some of the hydrogen peroxide solution through tube 6 into container B. Here further catalytic decomposition of hydrogen peroxide solution takes place and similarly hydrogen peroxide is forced by the oxygen produced into container C. Here again further decomposition occurs and either oxygen alone or a mixture of oxygen, water and hydrogen peroxide is ejected into container D. Then oxygen alone passes out to container E which it pressurises and forces the liquid therein out at a controlled rate. Alternatively container E may be omitted and the oxygen utilized directly e.g. in an aquarium.

The container D serves as a collection container in the event that mixing of liquid from D into the liquid in container E is undesirable.

The dosing process is regulated in dosing container A, whose walls must not react with the solution, through the choice of the size of the exposed active surface of catalyst 8, which is in contact with the solution and liberates the gas outside the feed pipe. This can take place by means of standard catalyst pellets or by means of a larger block which is shielded to a variable extent from the liquid by the controllable "hat" (a) or is brought at a small distance beneath the feed pipe. The control measure can also be combined with one another; the control can take place by hand (b) or automatically, perhaps by means of the osmotic pressure in a Pfeffer clay-cell.

Figure 2:
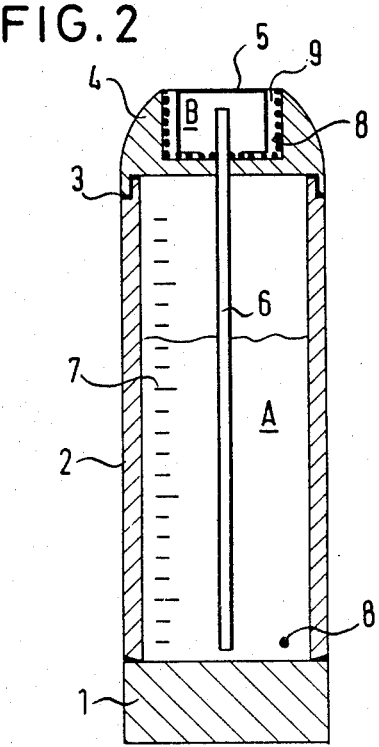
FIG. 2 shows a side view of a simplified embodiment of dispensing apparatus according to the invention.
Figure 4:
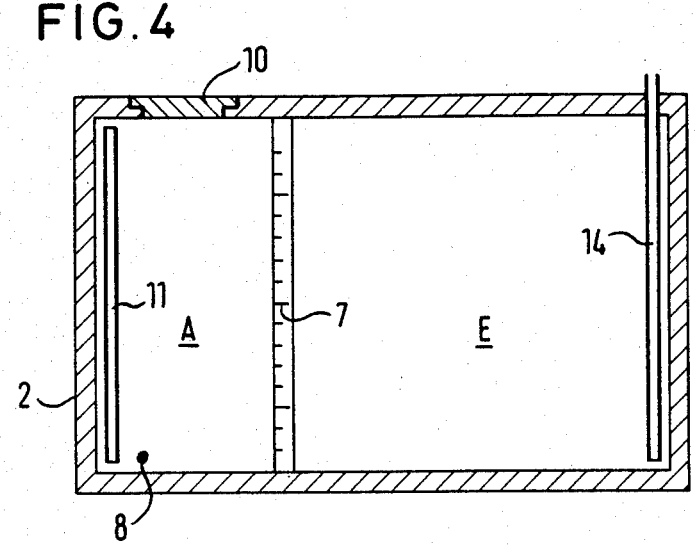
FIG. 4 shows a front view of a further embodiment according to the invention.

For special areas of use are provided both the following described simplifications which are represented in FIGS. 2/3 and FIGS. 4/5.

Figure 3:
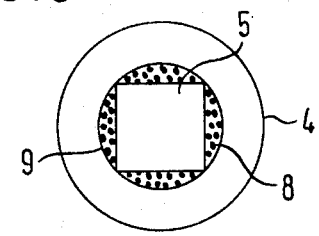
FIG. 3 represents a plan view of the apparatus of FIG. 2.

The first simplified embodiment of dosing apparatus according to the invention is reproduced in FIG. 2 and 3, wherein the reference numerals have the following significance: 1 ballast, 2 container wall, 3 seal, 4 cover, 5 cap, 6 feed pipe, 7 scale, 8 catalyst, 9 gas cushion, and A and B represent the respective containers.

Oxygen produced in container A forces hydrogen peroxide through tube 6 into container B under cap 5 where further catalytic deposition takes place both under the cap 5 and around cap 5. A gas cushion is thus formed within the cap and also a gas cushion 9 is formed surrounding the cap. However, not all the hydrogen peroxide is decomposed, and a small steady flow escapes along the sides of the cap 5.

In operation, the apparatus is submerged in an upright position in water. At introduction into the water, the air cushion beneath the cap 5 protects against dilution of the dosing solution in container 5. The freely-evolving oxygen in container B essentially does not contribute to the dissolved amount in the surrounding water, since free oxygen is dissolved in water only with great difficulty. The freely evolving oxygen serves almost exclusively for maintaining a gas cushion under the cap, producing a sort of valve operation, to produce a slight flow of the hydrogen peroxide and for activity control of the catalyst by forming the further gas cushion 9 in the vicinity of the catalyst. Leakage of water over the catalyst 8 would result in activity of the catalyst.

The essential operation is achieved through the, to a large extent undecomposed, remaining hydrogen peroxide escaping from the apparatus. It is completely water soluble and diffuses for that reason rapidly also into the most remote corners, the critical points; it raises the redox potential of the water and oxydizes for example hydrogen sulfide and poisonous catabolism products of egg white to non-poisonous substances; it destroys water cloudiness, such as diatomacae and bacteria in a concentration which for higher plants and also fish fry is completely harmless.

The hydrogen peroxide decomposes on glass and rough upper surfaces (for example "mould") so that throughout the water is enriched with free oxygen and excessive growth of the concentration of hydrogen peroxide is limited.

The rate of decomposition of hydrogen peroxide and the oxygen consumption in the water is dependent upon the temperature. The volume of hydrogen peroxide and therewith the dimensions of the apparatus can be kept very small, since for example in a 30% solution 17,500 times as much oxygen is stored in a metastable condition and is optimally useful as at 25° C. is dissolved in saturated water. A particular prominent advantage of the apparatus is for example that it functions without problems in open areas of water and also under a closed layer of ice and for longer than half a year.

Figure 5:
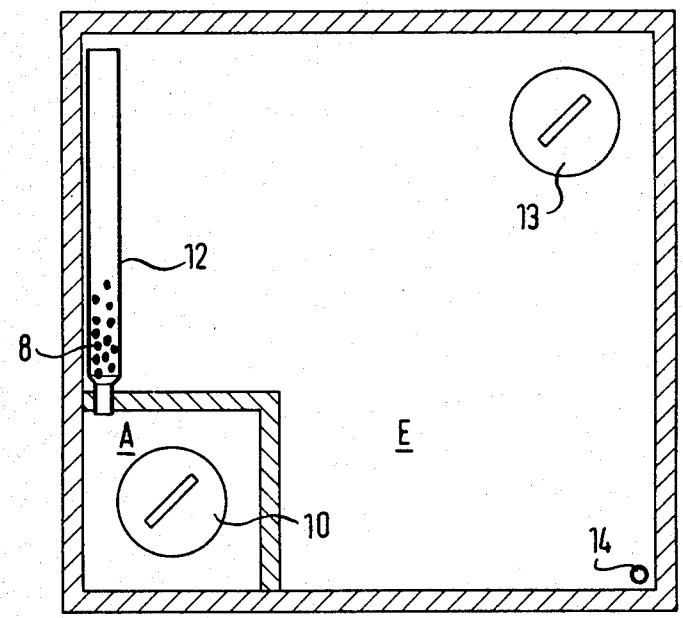
FIG. 5 represents a plan view of the apparatus of FIG. 4.

In FIGS. 4 and 5 there is reproduced a simplified embodiment according to the invention, in which the reference numerals have the following significance: 8 catalyst, 10 filling opening for container A, 11 feed pipe in container A, 12 decomposition pipe, 13 filling opening for container E and 14 feed pipe in container E.

This embodiment may be used for the watering of plants and supplying of drinks for animals, where suitable active ingredients can be added to the water, in general a small dilution of the active ingredient with water is of no importance, and therefore the collection container D of FIG. 1 can be dispensed with. Furthermore, it has been shown that the cascade stages in FIG. 1 formed through the containers B and C can be replaced by a simple, sufficiently long pipe 12 filled with catalyst pellets 8. Synchronized with the rate of decomposition, adjustment of the concentration takes place sufficiently slowly from the entry opening to the outlet opening. Still existing traces of the order of several ppm can eventually be decomposed by means of the catalyst, also still in the liquid container E if a catalyst is provided there. The dosing container and decomposition pipe can easily be accommodated many times over (10 to 100 times) in the larger liquid container E shown in FIG. 4.

The dosing apparatus can in use be mounted in desired manner on the system to be supplied, and plants growing for example epiphytically at a large height can be supplied with water and nutrients from soil, if necessary with corresponding lengthening of the feed pipe 14 with a tube.

In each described embodiment, the catalyst is preferably activated charcoal (e.g. coconut shell charcoal) or manganese dioxide.

The invention is not to be considered limited to the above embodiments described by way of example. The invention extends to all methods and embodiments of apparatus which do not depart from the spirit thereof.

I claim:

1. A method for continuous release of oxygen or liquid over a prolonged period of time, comprising:
   (a) producing water and oxygen in a first container by continuous catalytic decomposition of a hydrogen peroxide solution;
   (b) using the oxygen so produced as a drive gas to force the hydrogen peroxide solution from the first container into at least one further container containing a catalyst;
   (c) further continuously catalytically decomposing the hydrogen peroxide solution in said at least one further container; and
   (d) utilizing the evolved oxygen from the final one of said at least one further container.

2. A method according to claim 1, wherein at least the first container does not react with the hydrogen peroxide solution.

3. A method according to claim 1, wherein a dimensionally stable catalyst is used.

4. A method according to claim 1, wherein the decomposition rate is controlled by varying the active surface area of the catalyst.

5. A method according to claim 1, wherein standardized catalyst pellets are utilized.

6. Method according to claim 1, comprising using said oxygen evolved from the final container as a driving gas.

7. A method for the controllable continuous dispensing of oxygen and liquids over a prolonged period of time in biological systems, comprising evolving oxygen as a drive gas by the continuous catalytic decomposition of hydrogen peroxide into water and oxygen gas, said decomposition of the hydrogen peroxide taking place in stages, wherein, in a first stage, the hydrogen peroxide is decomposed in a first container and a first portion of the oxygen gas is liberated, in further stages, the hydrogen peroxide is further decomposed in one or more further containers in ultimate communication with the first container.

8. A dispensing method according to claim 7, comprising using the drive gas to expel a desired liquid media from a closed container.

9. A dispensing method according to claim 7, wherein said first portion of the oxygen gas serves to drive the hydrogen peroxide into a succeeding one of the further stages.

10. A dispensing method according to claim 7, wherein said catalyst includes in combination activated charcoal and manganese dioxide bound to a suitable carrier.

11. A dispensing apparatus for continuous dispensing of oxygen or liquids over a prolonged period of time comprising: a first container adapted to contain a hydrogen peroxide solution; a hydrogen peroxide decomposition catalyst in said first container; a further container containing additional such catalyst; and feed means connecting said first container with said further container such that oxygen produced by catalytic decomposition in said first container serves to drive the hydrogen peroxide solution from the first container to said further container.

12. Apparatus according to claim 11, wherein said feed means comprises a feed pipe extending from the first container at its upper end into said further container and wherein a cap member is inverted over the upper end of the feed pipe.

13. Apparatus according to claim 11, wherein the further container is arranged within the first container.

14. Apparatus according to claim 11, wherein a device is provided for adjusting the exposed active surface of the catalyst.

15. Apparatus according to claim 11, wherein the feed means comprises a pipe movably mounted in a manner such that it can completely or partially cover the catalyst.

16. Apparatus according to claim 11, further comprising a collection container to prevent escape of water becoming available during the decomposition.

17. Apparatus according to claim 11, wherein at least one given surface of said apparatus is coated with a solid catalyst, said given surface being chosen from the group consisting of the floor of at least one container, a wall of at least one container, the inner sides of the feed means, or a part thereof.

* * * * *